United States Patent
Hyatt et al.

(10) Patent No.: US 9,932,842 B2
(45) Date of Patent: Apr. 3, 2018

(54) STRUCTURAL GUIDE VANE LEADING EDGE

(71) Applicant: United Technologies Corporation, Hartford, CT (US)

(72) Inventors: Thomas B. Hyatt, Cromwell, CT (US); Carl Brian Klinetob, East Haddam, CT (US)

(73) Assignee: United Technologies Corporation, Farmington, CT (US)

( * ) Notice: Subject to any disclaimer, the term of this patent is extended or adjusted under 35 U.S.C. 154(b) by 298 days.

(21) Appl. No.: 14/776,382

(22) PCT Filed: Mar. 12, 2014

(86) PCT No.: PCT/US2014/024980
§ 371 (c)(1),
(2) Date: Sep. 14, 2015

(87) PCT Pub. No.: WO2014/151099
PCT Pub. Date: Sep. 25, 2014

(65) Prior Publication Data
US 2016/0024943 A1    Jan. 28, 2016

Related U.S. Application Data

(60) Provisional application No. 61/789,738, filed on Mar. 15, 2013.

(51) Int. Cl.
| | |
|---|---|
| F01D 5/28 | (2006.01) |
| F01D 25/00 | (2006.01) |
| F01D 5/14 | (2006.01) |
| F01D 5/16 | (2006.01) |
| F01D 25/16 | (2006.01) |
| F02C 7/20 | (2006.01) |

(52) U.S. Cl.
CPC ............. *F01D 5/288* (2013.01); *F01D 5/147* (2013.01); *F01D 5/16* (2013.01); *F01D 25/005* (2013.01);
(Continued)

(58) Field of Classification Search
CPC ........ F01D 5/147; F01D 5/288; F01D 25/005; F01D 25/007; F05D 2240/121;
(Continued)

(56) References Cited

U.S. PATENT DOCUMENTS

| | | |
|---|---|---|
| 4,470,754 A | 9/1984 | Manente, Jr. et al. |
| 4,798,514 A | 1/1989 | Pask |

(Continued)

FOREIGN PATENT DOCUMENTS

| | | |
|---|---|---|
| DE | 3821005 A1 | 12/1989 |
| WO | 9600842 | 1/1996 |
| WO | WO9600842 A1 | 1/1996 |

OTHER PUBLICATIONS

Extended European Search Report, for European Patent Application No. 14768006.0, dated Mar. 12, 2016, 8 pages.
(Continued)

*Primary Examiner* — Ninh H Nguyen
(74) *Attorney, Agent, or Firm* — Kinney & Lange, P.A.

(57) ABSTRACT

A structural guide vane for use in a gas turbine engine has a leading edge section, a trailing edge, a pressure surface and a suction surface. An erosion coating such as polyurethane resin is on the pressure surface and the suction surface. The leading edge of the vane is without the erosion coating and is bare metal. The vane is formed to include a plurality of pockets and bond shelves in the pressure surface side, and an epoxy bond line on the bond shelves holding a cover plate protected by the erosion coating.

18 Claims, 3 Drawing Sheets

(52) U.S. Cl.
CPC ......... *F01D 25/007* (2013.01); *F01D 25/162* (2013.01); *F02C 7/20* (2013.01); *F05D 2220/32* (2013.01); *F05D 2220/36* (2013.01); *F05D 2230/90* (2013.01); *F05D 2240/121* (2013.01); *F05D 2240/123* (2013.01); *F05D 2240/124* (2013.01); *F05D 2300/611* (2013.01); *Y02T 50/671* (2013.01); *Y02T 50/673* (2013.01)

(58) Field of Classification Search
CPC ......... F05D 2240/123; F05D 2240/124; F05D 2230/90; F05D 2300/611
See application file for complete search history.

(56) References Cited

U.S. PATENT DOCUMENTS

| | | | |
|---|---|---|---|
| 4,889,469 A | | 12/1989 | Wilkinson |
| 5,683,226 A | * | 11/1997 | Clark ..................... F01D 5/288 415/200 |
| 6,039,537 A | | 3/2000 | Scheurlen |
| 6,039,542 A | | 3/2000 | Schilling et al. |
| 6,345,955 B1 | * | 2/2002 | Heffron ................... F01D 5/145 415/115 |
| 8,001,792 B1 | | 8/2011 | Dvorak et al. |
| 8,083,485 B2 | * | 12/2011 | Chon ..................... F01D 5/187 416/97 R |
| 9,011,104 B2 | * | 4/2015 | Delvaux ............... C04B 35/486 416/241 R |
| 2008/0159856 A1 | | 7/2008 | Moniz et al. |
| 2009/0028699 A1 | | 1/2009 | Sjunnesson |
| 2010/0209235 A1 | | 8/2010 | Shim et al. |
| 2011/0052406 A1 | | 3/2011 | Bruce et al. |

OTHER PUBLICATIONS

International Search Report and Written Opinion from PCT Application Serial No. PCT/US2014/024980, dated Aug. 19, 2014, 11 pages.

Extended European Search Report, for European Patent Application No. 14768006.0, dated May 12, 2016, 8 pages.

* cited by examiner

STRUCTURAL GUIDE VANE LEADING EDGE

BACKGROUND

The present invention relates to an improved fan exit guide vane for use in gas turbines.

In a gas turbine engine used for propulsion, a fan case and a smaller diameter compressor case cooperate to radially bound an annular fan duct. Fan exit guide vanes span across the fan duct to de-swirl working medium fluid such as air flowing there through. The outer and inner extremities of the vanes are connected to the fan and compressor cases respectively.

When the guide vanes are hollow aluminum structural guide vanes, they need an erosion coating to protect the epoxy that is used on the concave surface of the vane. The leading edge (LE) must be thin, such as a radius of 0.021 inches (0.05334 cm), and coating the tip makes it difficult to meet aero requirements. Also a coated LE does not resist direct impact and thus is undesirable.

SUMMARY

The present invention is to erosion prevention coat the vane but not coat the leading edge such that the aluminum shape steps away from the leading edge aft of it so the coating and the leading edge meet smoothly.

DETAILED DESCRIPTION

Figure 1:
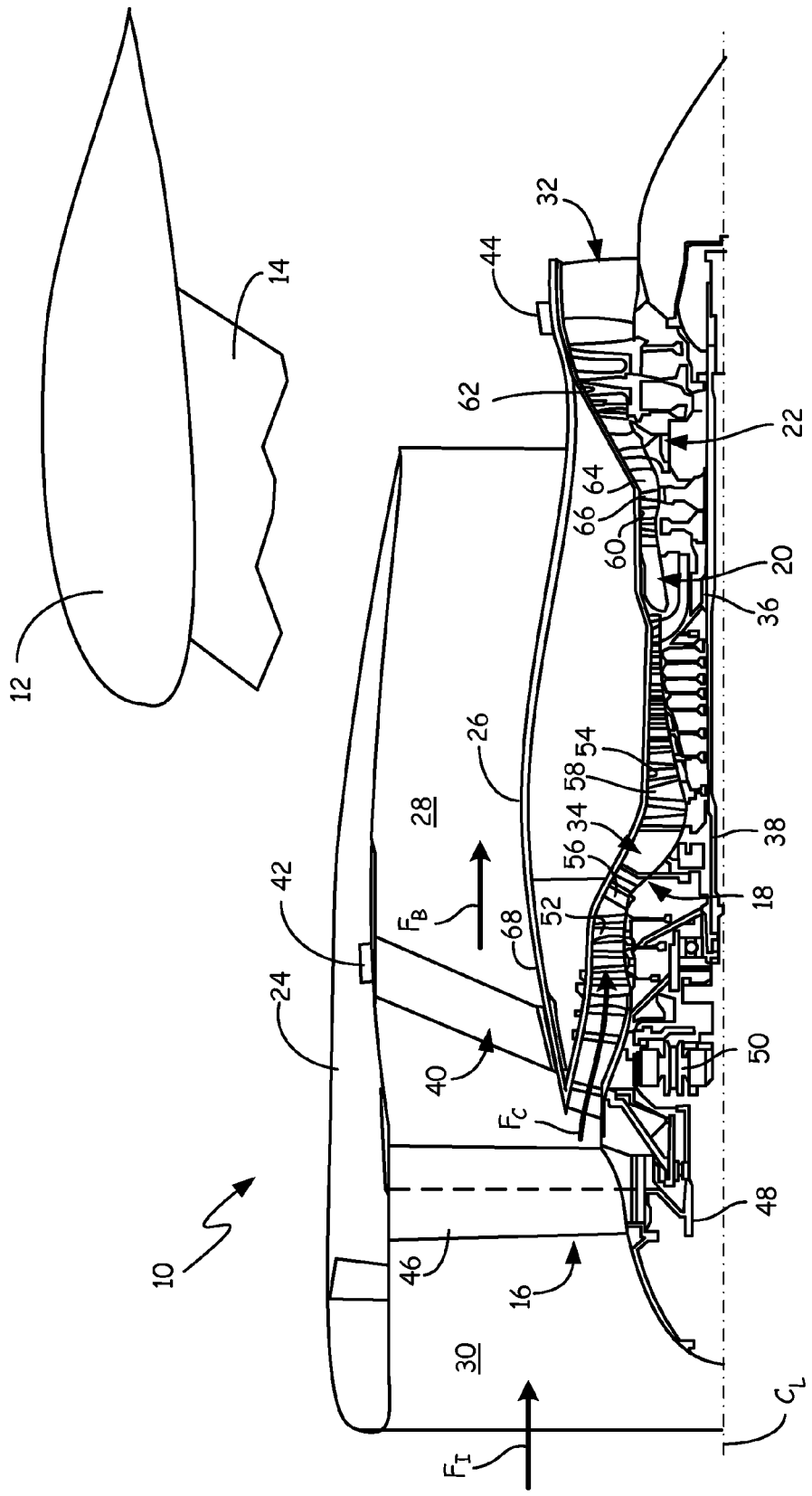
FIG. 1 is a cross-sectional view of an embodiment of a gas turbine engine.

FIG. 1 is a cross-sectional view of gas turbine engine 10, in a turbofan embodiment, aircraft wing 12, and pylon 14. As shown in FIG. 1, gas turbine engine 10 includes fan 16, compressor 18, combustor 20, turbine 22, fan case 24, core case 26, bypass duct 28, upstream inlet 30, downstream exhaust nozzle 32, core flow path 34, high pressure (HP) shaft 36, low pressure (LP) shaft 38, structural guide vanes 40, first engine mount 42, second engine mount 44, engine centerline $C_L$, incoming airflow $F_I$, core flow $F_C$, and bypass flow $F_B$. As embodied in FIG. 1, fan 16 includes fan airfoils 46, fan disk 48, and fan drive mechanism 50. Compressor 18 includes low pressure compressor (LPC) section 52, high pressure compressor (HPC) section 54, compressor vanes 56, and compressor blades 58. Turbine 22 includes high pressure turbine (HPT) section 60, low pressure turbine (LPT) section 62, turbine vanes 64, and turbine blades 66. Core case 26 includes compressor case 68.

Fan 16, compressor 18, combustor 20, and turbine 22 are arranged in flow series with upstream inlet 30 and downstream exhaust nozzle 32 along engine centerline $C_L$. Fan case 24 is disposed around fan 16. Core case 26 is disposed around compressor 18, combustor 20, and turbine 22 within fan case 24, thereby defining bypass duct 28 between core case 26 and fan case 24. Compressor case 68 is the portion of core case 26 that houses compressor 18. Compressor 18, combustor 20, and turbine 22 comprise the engine core with core flow path 34 extending through each section of the engine core. Compressor vanes 56 and compressor blades 58 are disposed in stages within both LPC section 52 and HPC section 54 of compressor 18. Turbine vanes 64 and turbine blades 66 are disposed in stages within both HPT section 60 and LPT section 62 of turbine 22. HP shaft 36 couples HPC section 54 to HPT section 60, forming the high pressure spool or high spool. LP shaft 38 couples fan 16 and LPC section 52 to LPT section 62, forming the low pressure spool or low spool. HP shaft 36 and LP shaft 38 are typically coaxially mounted, with the high and low spools independently rotating about engine centerline $C_L$.

Fan airfoils 46 of fan 16 are circumferentially arranged around fan disk 48, which is coupled directly or indirectly to LPC section 52 and driven by LP shaft 38. In some embodiments, such as the embodiment of FIG. 1, fan 16 is coupled to the low pressure spool via geared fan drive mechanism 50, providing independent fan speed control. As shown in FIG. 1, fan 16 is forward-mounted and provides thrust by accelerating flow downstream through bypass duct 28. In operation of gas turbine engine 10, incoming airflow $F_I$ enters inlet 30 and divides into core flow $F_C$ and bypass flow $F_B$, downstream of fan 16. Core flow $F_C$ propagates along core flow path 34 through compressor 18, combustor 20 and turbine section 22, and bypass flow $F_B$ propagates along the bypass flow path through bypass duct 28.

LPC section 52 and HPC section 54 of compressor 18 are utilized to compress incoming air for combustor 20, where fuel is introduced, mixed with air and ignited to produce hot combustion gas. Depending on the embodiment, fan 16 also provides some degree of compression (or pre-compression) to core flow $F_C$, and LPC section 52 (or a portion of it) may be omitted. Alternatively, an additional intermediate spool may be included, for example in a three-spool turboprop or turbofan configuration.

Combustion gas exits combustor 20 and enters HPT section 60 of turbine 22, encountering turbine vanes 64 and turbine blades 66. Turbine vanes 64 turn and accelerate the flow, and turbine blades 66 generate lift for conversion to rotational energy via HP shaft 36, driving HPC section 54 of compressor 18 via HP shaft 36. Partially expanded combustion gas transitions from HPT section 60 to LPT section 62, driving LPC section 52 and fan 16 via LP shaft 38. Exhaust flow exits LPT section 62 and gas turbine engine 10 via exhaust nozzle 32.

Structural guide vanes 40 are disposed inside bypass duct 28 and extend between fan case 24 and compressor case 68. As bypass flow $F_B$ flows from fan 16 into bypass duct 28, structural guide vanes 40 de-swirl bypass flow $F_B$ into an axial direction substantially parallel to engine centerline $C_L$. Structural guide vanes 40 also connect core case 26 to fan case 24 and center core case 26 and the engine core inside fan case 24. First engine mount 42 is disposed on fan case 24 proximate structural guide vanes 40 and second engine mount 44 may be disposed on core case 26 proximate downstream exhaust nozzle 32. First engine mount 42 and second engine mount 44 are used to connect gas turbine engine 10 to pylon 14, pylon 14 being connected to aircraft wing 12. During operation of gas turbine engine 10, structural guide vane 40 supports static and dynamic loads between compressor case 68 and fan case 24.

Figure 2:
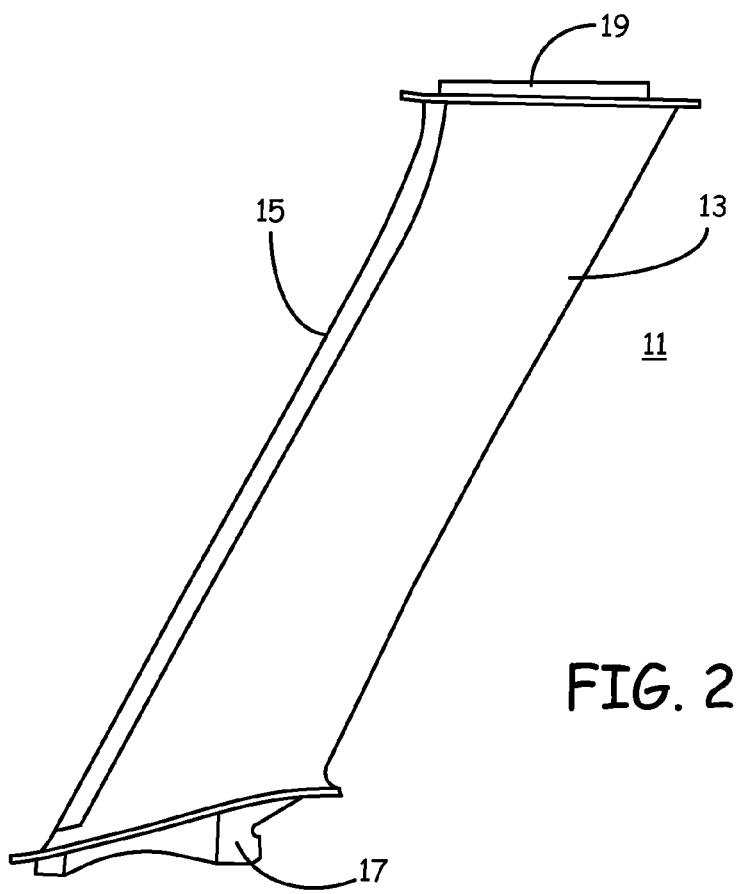
FIG. 2 is a perspective view of a support guide vane with the present invention.

FIG. 2 shows support guide vane 11. Paint 13 in FIG. 2 protects guide vane 11. Guide vane 11 is in the flow path $F_B$ and erosion by, for example, runway grit, would destroy guide vane 11 without paint 13. Leading edge 15 is not coated because it is capable of resisting erosion and also maintaining the thin radius required by aerodynamics. Guide vane 11 has lower end 17 and upper end 19 for mounting to fan case 24 and compressor case 68 as seen in FIG. 1 where guide vane 40 now is shown.

Guide vane 11 is coated with paint 13 over the entire span of the vane and is coated on both sides with paint 13 over the chord of vane 11 from a point just rearward from the leading edge, as is trailing edge 16.

Figure 3:
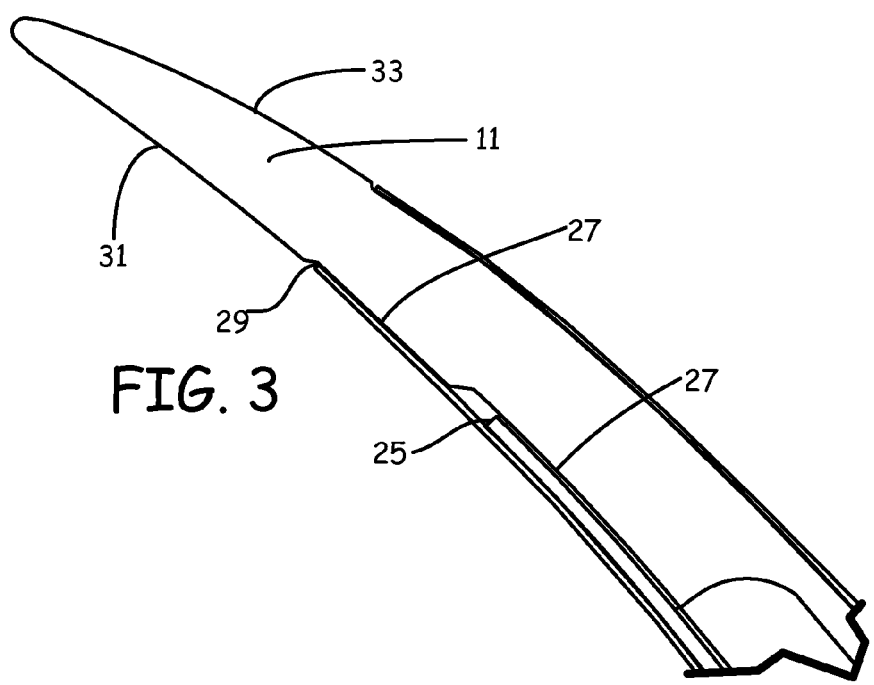
FIG. 3 is an enlarged view of a portion of the vane of FIG. 2

FIG. 3 shows the suction side or convex side 33 of guide vane 11 with a polyurethane coating 13 that is about 0.005 inches (0.0127 cm) thick. Pressure side or concave side 31 of guide vane 11 has a thicker polyurethane coating 13 of about 0.010 inches (0.0254 cm) in order to have adequate protection of bond shelf 27. Also shown in FIG. 3 is gap 29 formed at the leading edge 15. Shelf 27 receives cover plate 25 but cover plate 25 does not extend all the way to close gaps 29.

Figure 4:
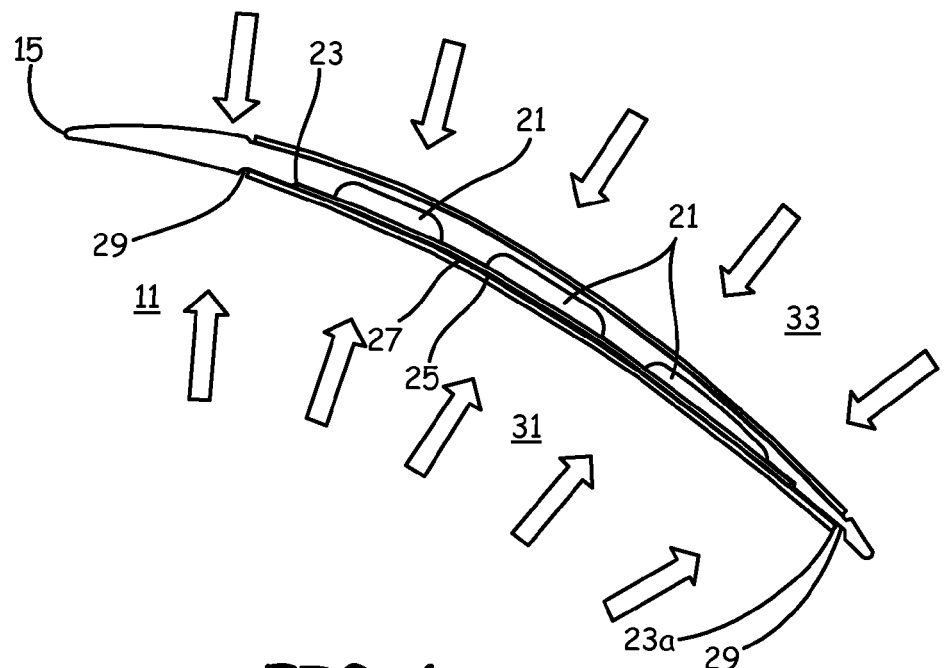
FIG. 4 is a schematic section view of the present invention on a vane.
Figure 5:
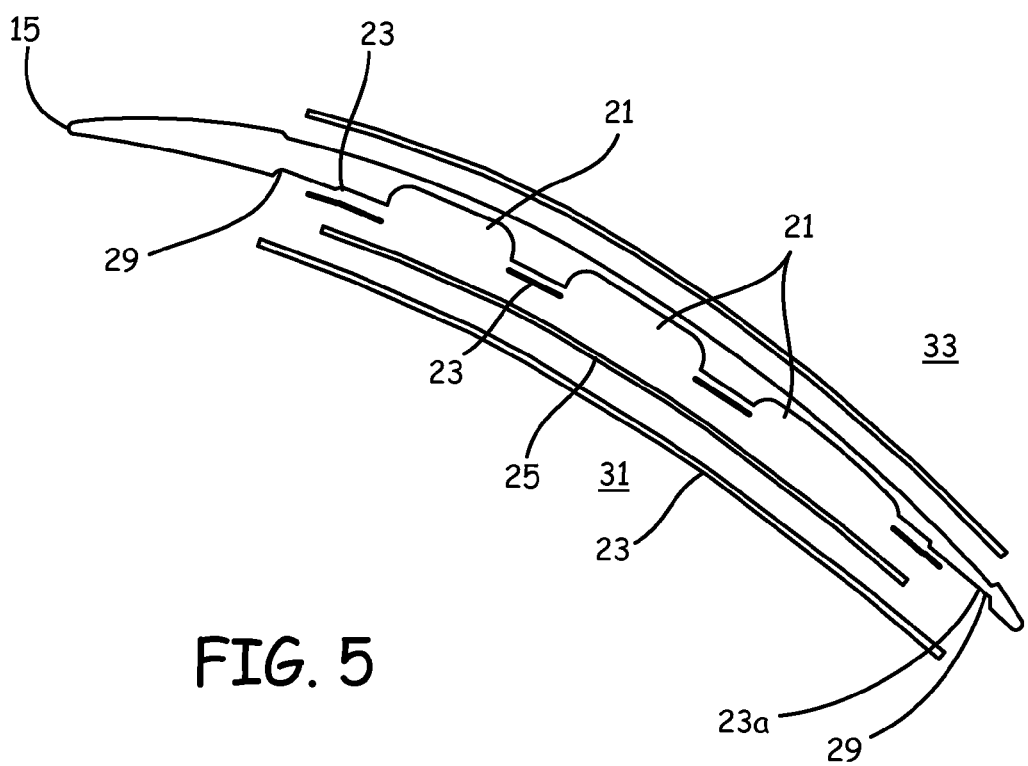
FIG. 5 is an exploded view of FIG. 4.

FIGS. 4 and 5 illustrate specific features of guide vane 11. Guide vane 11 includes a plurality of pockets 21 that are used to lighten the weight of vane 11. Pockets 21 covered with cover plate 25. Bond shelves 27 are coated with epoxy resin 23 that holds cover plate 25 on bond shelves 27. Epoxy resin 23a extends past bond shelf 27 to fill gap 29 at both ends of bond shelf 27 and provide a smooth continuous surface thereon.

After construction of the guide vane 11, both the pressure side 31 and the suction side 33 are coated with erosion resistant paint 13, leaving leading edge 15 uncoated. The vane is ready for use.

Although the present invention has been described with reference to preferred embodiments, workers skilled in the art will recognize that changes may be made in form and detail without departing from the spirit and scope of the invention.

Discussion of Possible Embodiments

The following are nonexclusive descriptions of possible embodiments of the present invention.

A structural guide vane for use in gas turbine engines includes a leading edge, pressure surface and suction surface. The pressure surface and suction surface are coated with an erosion resistant coating and the leading edge is uncoated.

The structural guide vane of the preceding paragraph can optionally include additionally and/or alternatively, any one or more of the following features, configurations and/or additional components.

The erosion resistant coating may be polyurethane resin.

The pressure side coating is thicker than the suction side.

The suction side has an erosion coating about 0.005 inches (0.0127 cm) thick and pressure side has a thicker erosion coating of about 0.010 inches (0.0254 cm).

The structural guide vane may have pockets that are used to lighten the weight of the vane and are covered with an epoxy bond line and a cover plate.

The vane may have polyurethane resin coatings on the pressure side that are thicker than the coating on the section side.

The suction side has an erosion coating about 0.005 inches (0.0127 cm) thick and pressure side has a thicker erosion coating of about 0.010 inches (0.0254 cm).

A method of forming a structural guide vane wherein the vane has a leading edge, a pressure side and a suction side, with an erosion coating on the pressure side and the suction side but not on the leading edge.

The method of the preceding paragraph can optionally include additionally and/or alternatively, any one or more of the following features, configurations and/or additional components.

The erosion resistant coating may be polyurethane resin.

The pressure side coating is thicker than the suction side.

The suction side has an erosion coating about 0.005 inches (0.0127 cm) thick and pressure side has a thicker erosion coating of about 0.010 inches (0.0254 cm).

The structural guide vane may have pockets that are used to lighten the weight of the vane and are covered with an epoxy bond line and a cover plate.

The vane may have polyurethane resin coatings on the pressure side that are thicker than the coating on the section side.

The suction side has an erosion coating about 0.005 inches (0.0127 cm) thick and pressure side has a thicker erosion coating of about 0.010 inches (0.0254 cm).

The invention claimed is:

1. A structural guide vane for use in a gas turbine engine, the structural guide vane comprising:
a vane having a leading edge section, a trailing edge, a pressure surface and a suction surface; and
a first erosion coating on the pressure side extending from the leading edge section to the trailing edge and a second erosion coating on the suction surface extending from the leading edge section to the trailing edge with both the first and second erosion coatings starting rearward of the leading edge and the leading edge is an exposed portion of the structural guide vane;
wherein the erosion coating is a polyurethane resin.

2. The guide vane of claim 1, wherein the pressure side has a thicker erosion coating than the suction side coating.

3. The guide vane of claim 2, wherein the suction side has an erosion coating about 0.005 inches (0.0127 cm) thick and pressure side has a thicker erosion coating of about 0.010 inches (0.0254 cm).

4. The guide vane of claim 1, wherein the vane includes a plurality of pockets and bond shelves in the pressure surface side, and an epoxy bond line on the bond shelves holding a cover plate to cover the plurality of pockets and provide a uniform pressure surface.

5. A method of forming a structural guide vane for use in a gas turbine engine, the method comprising:
forming a vane having a leading edge section, a trailing edge, a pressure surface and a suction surface;
placing a first erosion coating on the pressure surface extending from the leading edge section to the trailing edge and a second erosion coating on the suction surface extending from the leading edge section to the trailing edge with both the first and second erosion coatings starting rearward of the leading edge and the leading edge is an exposed portion of the structural guide vane;
wherein the erosion coating is a polyurethane resin.

6. The method of claim 5, wherein the pressure side has a thicker erosion coating than the suction side coating.

7. The method of claim 6, wherein the suction side has an erosion coating about 0.005 inches (0.0127 cm) thick and the pressure side has a thicker erosion coating of about 0.010 inches (0.0254 cm).

8. The method of claim 5, wherein the vane is formed to includes a plurality of pockets and bond shelves in the pressure surface side, and an epoxy bond line on the bond shelves holding a cover plate to cover the plurality of pockets and provide a uniform pressure surface.

9. A structural guide vane for use in a gas turbine engine, the structural guide vane comprising:
- a vane having a leading edge section, a trailing edge, a pressure surface and a suction surface; and
- a first erosion coating on the pressure side extending from the leading edge section to the trailing edge and a second erosion coating on the suction surface extending from the leading edge section to the trailing edge with both the first and second erosion coatings starting rearward of the leading edge and the leading edge is an exposed portion of the structural guide vane;
- wherein the vane includes a plurality of pockets and bond shelves in the pressure surface side, and an epoxy bond line on the bond shelves holding a cover plate to cover the plurality of pockets and provide a uniform pressure surface.

10. The guide vane of claim 9, wherein the pressure side has a thicker erosion coating than the suction side coating.

11. The guide vane of claim 10, wherein the erosion coating is a polyurethane resin.

12. The guide vane of claim 11, wherein the suction side has an erosion coating about 0.005 inches (0.0127 cm) thick and pressure side has a thicker erosion coating of about 0.010 inches (0.0254 cm).

13. The guide vane of claim 9, wherein the erosion coating is a polyurethane resin.

14. A method of forming a structural guide vane for use in a gas turbine engine, the method comprising:
- forming a vane having a leading edge section, a trailing edge, a pressure surface and a suction surface;
- placing a first erosion coating on the pressure surface extending from the leading edge section to the trailing edge and a second erosion coating on the suction surface extending from the leading edge section to the trailing edge with both the first and second erosion coatings starting rearward of the leading edge and the leading edge is an exposed portion of the structural guide vane;
- wherein the vane includes a plurality of pockets and bond shelves in the pressure surface side, and an epoxy bond line on the bond shelves holding a cover plate to cover the plurality of pockets and provide a uniform pressure surface.

15. The method of claim 14, wherein the pressure side has a thicker erosion coating than the suction side coating.

16. The method of claim 15, wherein the erosion coating is a polyurethane resin.

17. The method of claim 15, wherein the suction side has an erosion coating about 0.005 inches (0.0127 cm) thick and the pressure side has a thicker erosion coating of about 0.010 inches (0.0254 cm).

18. The method of claim 17, wherein the erosion coating is a polyurethane resin.

\* \* \* \* \*